H. T. ROBERTS.
ART OF MANUFACTURING HUB STRUCTURES.
APPLICATION FILED APR. 30, 1919.
1,383,486. Patented July 5, 1921.
Fig.1. Fig.2. Fig.3.
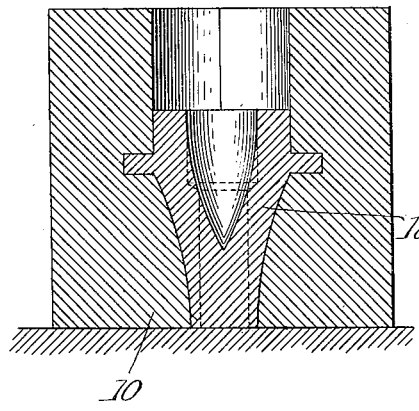
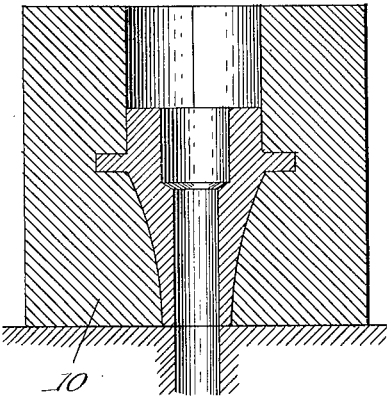
Fig.4.
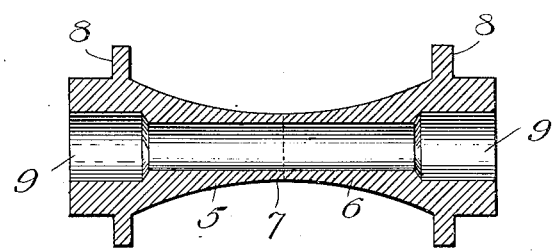
Witnesses:
Inventor:
Henry T. Roberts,

UNITED STATES PATENT OFFICE.

HENRY T. ROBERTS, OF NEW YORK, N. Y.

ART OF MANUFACTURING HUB STRUCTURES.

1,383,486.   Specification of Letters Patent.   Patented July 5, 1921.

Application filed April 30, 1919. Serial No. 293,737.

*To all whom it may concern:*

Be it known that I, HENRY T. ROBERTS, a citizen of the United States, residing at New York, in the county of New York and State of New York, have invented a new and useful Improvement in the Art of Manufacturing Hub Structures, of which the following is a specification.

My invention relates, more particularly, to the manufacture of hub structures in general, whether forming a part of wheels, or any other structure, and which involves a tubular portion having enlarged peripheral portions, usually in the form of flanges or bearing-housings at the ends of the tubular portion, my invention presenting particular advantage in hubs for wheels, as, for example, wire-spoke bicycle, motor-cycle or automobile wheels.

The manufacture of hub structures according to previously known methods of manufacture involves either the turning, or machining of the hub to the desired form from a solid metal bar, or the forging of the hub in one piece and the turning or machining of the forging into the shape desired, and where the hubs are to be used in wire-wheels, the boring of the spoke receiving holes in alternately inclined position in the spoke-flanges of the hub. The first of the two above-referred to methods presents the great objection of relatively large cost of producing the hub, not only because of the amount of time involved in its manufacture and the requirement of expensive machinery to produce it, but because of the waste of material due to the turning down of a solid cylindrical bar to the shape desired. The other of the two above-referred to methods also presents the great objection of expensiveness of manufacture, the operation requiring the machining of the forging with consequent expense and waste of metal. Furthermore, both of the above referred to methods present the further objection, where wire spokes are used with the hub, of rendering very difficult and expensive, the drilling of the inclined spoke holes in the spoke flanges, as in the drilling of these holes in either of the spoke-flanges, the other spoke-flange is in the way.

One of my objects is, generally, to reduce the cost of hub-structures and another to produce a forged hub-structure at a much less cost than hub-structures have heretofore been produced and which shall present all of the advantages incident to a forged hub.

Referring to the accompanying drawing—

Figure 1 is a view in elevation of a portion of a bar of steel, for example, from which the hub may be formed. Fig. 2 is a sectional view of a die such as may be used in forming one of the sections of which the hub is formed, showing the section in the process of being forged into shape. Fig. 3 is a similar view showing the section after the forging thereof has been completed; and Fig. 4 shows the hub in completed condition.

In accordance with the preferred manner of carrying out my invention I form the hub of two sections 5 and 6 preferably of exactly the same shape and size, when the hub is of a type wherein the ends are of the same form, which, when welded, or otherwise united, along their abutting ends at the joint indicated at 7 form the completed hub. The hub in the particular illustrated form has annular spoke-flanges 8 at its opposite ends and is apertured throughout its length as indicated, with sockets 9 at its extremities forming housings for bearings (not shown).

The sections 5 and 6 may be forged to shape in any desirable manner, as, for example, by upsetting them from bars of metal in a so-called upsetting machine, forging them on a "bull-dozer" or forged in a regular drop-forging machine. In the drawings I have shown the sections as forged in an upsetting machine involving a die, or mold, member 10 of an internal form suitable for producing the sections of the desired shape and size from bars of suitable metal, as, for example, steel, as represented at 11, heated to softened condition, inserted downwardly into the member 10 and held at its lower end and then first operated on by an upsetting tool (not shown) which flows the metal to the condition shown in Fig. 2, wherein the mass is represented at 12, and then by a forming tool which completes the shaping of the mass to form it into one of the hub-sections as shown in Fig. 3, and force through the lower end of the member 10 the relatively small amount of metal required to be displaced and forced out of the member 10 to produce the shape of the finished hub-sections.

The hub-sections are then placed in alining condition in the arrangement shown in endwise abutting relation, and in this condition the metal of the sections united as by electrically welding the sections together at their abutting surfaces along the line 7, the sections thus forming a strong unitary hub-structure.

Where the hub is to be used in a wire-wheel, as in the construction shown, the flanges 8 are suitably bored to provide the proper arrangement of wire-spoke-receiving holes (not shown) before uniting the hub-sections, and when the sections are secured together as explained, no turning, or machining is required, it only being necessary to polish off any fin which might have been produced in the welding together of the sections.

What I claim as new, and desire to secure by Letters Patent, is:

1. In the art of manufacturing hub-structures, the method of forming a hub-structure which consists in uniting together in alining condition, to form a unitary structure, sections of metal which when joined together in alining condition form the hub.

2. In the art of manufacturing hub-structures, the method of forming a hub-structure which consists in uniting together at their abutting ends to form a unitary structure, sections of metal which when joined together in endwise abutting relation form the hub structure.

3. In the art of manufacturing hub-structures, the method of forming a hub structure which consists in uniting together at their abutting ends, metal sections of the same size and shape and which when joined together in endwise abutting relation form the hub structure.

4. In the art of manufacturing hub-structures, the method of forming a hub-structure which consists in forging sections of metal which when joined together in alining condition form the hub, and thereupon welding the sections together in alining condition.

5. In the art of manufacturing hub-structures, the method of forming a hub-structure which consists in forging sections of metal which when joined together in endwise-abutting relation form the hub-structure, and thereupon welding the sections together at their abutting ends.

6. In the art of manufacturing hub-structures, the method of forming a hub-structure which consists in forging sections of the same size and shape out of metal which when joined together in endwise-abutting relation form the hub-structure, and thereupon welding the sections together at their abutting ends.

7. A hub-structure formed of sections each provided with a spoke-flange for connection therewith of wire-spokes, said sections being united together crosswise of the hub-structure.

8. A hub-structure formed of sections each provided with a spoke-flange for connection therewith of wire-spokes, said sections being welded together at the joint therebetween extending crosswise of the hub-structure.

9. A hub-structure formed with a peripheral enlargement, said hub-structure being formed of sections disposed in alinement, with the metal of the one section united as by welding to the metal of the other section to make a solid unitary structure.

10. A hub-structure formed of forged sections each provided with a peripheral enlargement, said sections being disposed in alinement, with the metal of the one section united, as by welding, to the metal of the other section to make a solid unitary structure.

11. A hub-structure formed of forged sections of the same shape and size and each provided with a peripheral enlargement, said sections being disposed in alinement, with the metal of the one section united, as by welding, to the metal of the other section to make a solid unitary structure.

12. A hub-structure formed of forged sections each provided with a peripheral enlargement, said sections being disposed in end to end abutting relation with the metal of the one section united, as by welding, to the metal of the other section to make a solid unitary structure.

13. A hub-structure formed of forged sections, each provided with a spoke-flange for connection therewith of wire-spokes, said sections being disposed in end to end relation with the metal of the one section united, as by welding, to the metal of the other section to make a solid unitary structure.

HENRY T. ROBERTS.